(12) United States Patent
Yau

(10) Patent No.: US 9,985,451 B2
(45) Date of Patent: May 29, 2018

(54) SYSTEM AND METHOD FOR PROVIDING RECHARGEABLE BATTERIES

(71) Applicant: Tricopian, LLC, Del Mar, CA (US)

(72) Inventor: Chi W. Yau, Escondido, CA (US)

(73) Assignee: Tricopian, LLC, Del Mar, CA (US)

( * ) Notice: Subject to any disclaimer, the term of this patent is extended or adjusted under 35 U.S.C. 154(b) by 0 days. days.

(21) Appl. No.: 14/436,448

(22) PCT Filed: Oct. 16, 2013

(86) PCT No.: PCT/US2013/065308
§ 371 (c)(1),
(2) Date: Apr. 16, 2015

(87) PCT Pub. No.: WO2014/062846
PCT Pub. Date: Apr. 24, 2014

(65) Prior Publication Data
US 2016/0028263 A1    Jan. 28, 2016

Related U.S. Application Data

(60) Provisional application No. 61/716,421, filed on Oct. 19, 2012, provisional application No. 61/832,620, filed on Jun. 7, 2013.

(51) Int. Cl.
*H02J 7/00* (2006.01)
*G07F 15/00* (2006.01)

(52) U.S. Cl.
CPC .......... *H02J 7/0057* (2013.01); *G07F 15/005* (2013.01); *H02J 7/007* (2013.01);
(Continued)

(58) Field of Classification Search
CPC ....... Y02E 60/12; H02J 7/0042; H02J 7/0045; H01M 10/44; H01M 10/46
(Continued)

(56) References Cited

U.S. PATENT DOCUMENTS 2,119,063 A    5/1938 Wagner
4,700,375 A    10/1987 Reed
(Continued)

FOREIGN PATENT DOCUMENTS

CN    101083011 A    12/2007
EP    0 577 121 A1    1/1994
(Continued)

OTHER PUBLICATIONS

International Search Report and Written Opinion, filed in PCT/US2013/065308 dated May 7, 2014.
(Continued)

*Primary Examiner* — Yalkew Fantu
*Assistant Examiner* — Mohammed J Sharief
(74) *Attorney, Agent, or Firm* — Knobbe Martens Olson & Bear LLP

(57) ABSTRACT

A system and method for charging a plurality of batteries is disclosed. A battery charging hub may have a plurality of charging/discharging ports capable of applying varying charging programs based on the state of a battery. A battery charging hub may include wired or wireless communication ability to allow the battery charging hub to communicate with remote units regarding the state and quality of batteries at the charging hub. A virtual disposable battery is also disclosed.

19 Claims, 9 Drawing Sheets

(52) U.S. Cl.
CPC .......... *H02J 7/0021* (2013.01); *H02J 7/0027* (2013.01); *H02J 7/0045* (2013.01); *H02J 7/0068* (2013.01); *H02J 7/0075* (2013.01); *H02J 7/0077* (2013.01); *G07F 15/006* (2013.01); *H02J 7/0008* (2013.01); *H02J 2007/0096* (2013.01); *Y02T 90/12* (2013.01); *Y02T 90/128* (2013.01)

(58) Field of Classification Search
USPC .................................................. 320/107, 110
See application file for complete search history.

(56) References Cited

U.S. PATENT DOCUMENTS

| | | | |
|---|---|---|---|
| 4,907,250 A | 3/1990 | Ricks | |
| 5,298,346 A | 3/1994 | Gyenes et al. | |
| 5,307,000 A * | 4/1994 | Podrazhansky | H01M 10/44 320/129 |
| 5,349,535 A | 9/1994 | Gupta | |
| 5,485,090 A | 1/1996 | Stephens | |
| 5,489,835 A | 2/1996 | Stephens | |
| 5,525,439 A | 6/1996 | Huhndorff et al. | |
| 5,544,784 A | 8/1996 | Malaspina | |
| 5,572,110 A * | 11/1996 | Dunstan | H02J 7/0004 320/106 |
| 5,621,297 A | 4/1997 | Feldstein | |
| 5,631,536 A * | 5/1997 | Tseng | B60L 11/1822 320/124 |
| 5,694,019 A | 12/1997 | Uchida et al. | |
| 6,154,006 A | 11/2000 | Hatanaka et al. | |
| 6,191,554 B1 | 2/2001 | Nakane | |
| 6,303,248 B1 | 10/2001 | Peterson | |
| 6,370,844 B1 | 4/2002 | Stricker | |
| 6,618,644 B2 | 9/2003 | Bean | |
| 6,764,003 B1 | 7/2004 | Martschitsch et al. | |
| 6,822,422 B2 | 11/2004 | Sagawa | |
| 6,862,496 B2 | 3/2005 | Fukuoka et al. | |
| 7,119,517 B2 | 10/2006 | Mikuriya et al. | |
| 7,491,466 B2 | 2/2009 | Feddrix et al. | |
| 7,888,913 B1 | 2/2011 | Marty | |
| 8,055,919 B2 | 11/2011 | Magnusson | |
| 9,096,141 B2 * | 8/2015 | Soong | B60L 11/1822 |
| 2001/0001766 A1 | 5/2001 | Humphreys et al. | |
| 2001/0037207 A1 | 11/2001 | Dejaeger | |
| 2003/0055735 A1 | 3/2003 | Cameron et al. | |
| 2003/0120380 A1 | 6/2003 | Bean | |
| 2004/0113588 A1 | 6/2004 | Mikuriya et al. | |
| 2004/0189245 A1 | 9/2004 | Teraoka et al. | |
| 2005/0001591 A1 | 1/2005 | Nagamine et al. | |
| 2005/0102233 A1 | 5/2005 | Park et al. | |
| 2005/0236266 A1 * | 10/2005 | Poole | C23C 14/34 204/192.13 |
| 2006/0108979 A1 | 5/2006 | Daniel et al. | |
| 2006/0197502 A1 * | 9/2006 | Kaminsky | H02J 7/0075 320/131 |
| 2006/0216586 A1 | 9/2006 | Tucholski | |
| 2006/0275656 A1 | 12/2006 | Feddrix et al. | |
| 2007/0069153 A1 | 3/2007 | Pai-Paranjape et al. | |
| 2007/0273327 A1 | 11/2007 | Daniel et al. | |
| 2008/0084178 A1 * | 4/2008 | Dowd | H01M 10/42 320/101 |
| 2008/0136378 A1 * | 6/2008 | Iwahana | G01R 31/3651 320/153 |
| 2008/0160392 A1 | 7/2008 | Toya et al. | |
| 2008/0228613 A1 | 9/2008 | Alexander | |
| 2008/0281732 A1 | 11/2008 | Yamada | |
| 2009/0092860 A1 | 4/2009 | Yamamoto et al. | |
| 2009/0153101 A1 * | 6/2009 | Meyer | H02J 7/0004 320/119 |
| 2009/0212736 A1 * | 8/2009 | Baarman | H02J 7/0004 320/106 |
| 2009/0212781 A1 | 8/2009 | Bertness et al. | |
| 2009/0233159 A1 | 9/2009 | Phillips et al. | |
| 2009/0281891 A1 | 11/2009 | Walker et al. | |
| 2010/0052609 A1 | 3/2010 | Daniel et al. | |
| 2010/0169231 A1 | 7/2010 | Bowles et al. | |
| 2010/0205463 A1 | 8/2010 | Magnusson | |
| 2010/0247998 A1 * | 9/2010 | Hostler | H01M 2/1077 429/120 |
| 2010/0274904 A1 | 10/2010 | Schirar et al. | |
| 2010/0295503 A1 * | 11/2010 | Bourilkov | H02J 7/0006 320/106 |
| 2010/0312380 A1 | 12/2010 | Lowe | |
| 2011/0057624 A1 * | 3/2011 | Rizzo | H02J 7/0075 320/152 |
| 2011/0181242 A1 * | 7/2011 | Lee | H02J 7/0003 320/110 |
| 2011/0225098 A1 | 9/2011 | Wolff et al. | |
| 2012/0074893 A1 * | 3/2012 | Cole | H02J 7/35 320/101 |
| 2012/0109797 A1 | 5/2012 | Shelton et al. | |
| 2012/0276428 A1 | 11/2012 | Pendry | |
| 2013/0063073 A1 | 3/2013 | Kawasaki et al. | |
| 2013/0181661 A1 | 7/2013 | Workman | |
| 2014/0310165 A1 | 10/2014 | Yau | |
| 2015/0045947 A1 | 2/2015 | Yau | |
| 2015/0140379 A1 | 5/2015 | Yau | |
| 2016/0028263 A1 | 1/2016 | Yau | |
| 2016/0197337 A1 | 7/2016 | Yau | |

FOREIGN PATENT DOCUMENTS

| | | |
|---|---|---|
| EP | 0768724 A2 | 4/1997 |
| EP | 1136961 A1 | 9/2001 |
| EP | 1391961 A1 | 2/2004 |
| EP | 2015381 A2 | 1/2009 |
| EP | 2328173 A1 | 6/2011 |
| GB | 2042787 A | 9/1980 |
| JP | H10-221418 | 8/1998 |
| JP | H11-031485 A | 2/1999 |
| JP | 2001023037 A | 1/2001 |
| JP | 2001096236 A | 4/2001 |
| JP | 2001222991 A | 8/2001 |
| JP | 2001266954 | 9/2001 |
| JP | 2010-211754 | 9/2010 |
| JP | 2011-054542 | 3/2011 |
| JP | 2011096233 A | 5/2011 |
| JP | 2011103104 | 5/2011 |
| JP | 2011210663 A | 10/2011 |
| JP | 2012-055051 | 3/2012 |
| JP | 2012-070480 | 4/2012 |
| JP | 2002-199605 | 7/2012 |
| WO | WO 2001/095454 A1 | 12/2001 |
| WO | WO 01/54984 A1 | 8/2004 |
| WO | WO 2009/105595 A2 | 8/2009 |
| WO | WO 2009/111743 | 9/2009 |
| WO | WO 2013/165597 A1 | 11/2013 |

OTHER PUBLICATIONS

International Search Report and Written Opinion, filed in PCT/US2013/031667 dated Jul. 19, 2013.
International Search Report and Written Opinion, filed in PCT/US2013/030578 dated Jul. 9, 2013.
International Search Report and Written Opinion, filed in PCT/US2012/065326 dated Feb. 6, 2013.
International Search Report and Written Opinion dated Dec. 5, 2014 for Application No. PCT/US2014/052392.

* cited by examiner

SYSTEM AND METHOD FOR PROVIDING RECHARGEABLE BATTERIES

CROSS REFERENCE TO RELATED APPLICATIONS

The current application claims priority to and the benefit of U.S. Provisional Application No. 61/716,421, filed Oct. 19, 2012 and U.S. Provisional Application No. 61/832,620, filed Jun. 7, 2013, the entire contents of which are herein incorporated by reference.

BACKGROUND

Field

This relates to the field of batteries, and particularly to the field of rechargeable batteries.

Description of the Related Art

Batteries power a variety of devices. As more devices become battery powered, consumer demand for batteries increases. This results in the manufacturing and disposal of ever greater numbers of batteries, which can include heavy metals and other toxic chemicals. Some people have begun using rechargeable batteries to save money and to minimize battery waste. However, rechargeable batteries require expensive chargers, and are not as convenient as disposable batteries.

SUMMARY

Some embodiments disclose a charging hub comprising a charging unit; a control unit; memory comprising a plurality of charging programs; a plurality of charging/discharging ports electrically connected to the charging unit and the control unit, wherein the charging unit is configured to select and apply a charging program to a device under charge and wherein the charging unit is in electrical communication with a control unit configured to direct operation of the hub.

In some embodiments, the charging/discharging ports comprises a positive terminal bar comprising a positive terminal, and a negative terminal bar comprising a negative terminal.

In some embodiments, the charging program comprises a rejuvenation program.

In some embodiments, the hub further comprises an input unit configured to receive input and transmit the received input to the control unit.

In some embodiments, the input comprises a charging program.

In some embodiments, the hub is divided into charging zones which each comprise a plurality of charging/discharging ports.

In some embodiments, the charging/discharging ports within a zone apply the same charging program.

In some embodiments, the charging unit is configured to sense at least one characteristic of the device under charge and select the charging program for the device under charge based on the sensed characteristic.

In some embodiments, the control unit is configured to communicate with remote unit.

In some embodiments, the charging unit is configured to apply a current pulse to the device under charge and to measure a voltage spike resulting from the application of the current pulse.

In some embodiments, the control unit is configured to identify the device under charge as rechargeable when the measured voltage spike is less than a predetermined threshold. In some embodiments, the predetermined threshold is about 1.5 volts.

In some embodiments, the control unit is configured to identify the device under charge as non-rechargeable when the measured voltage spike is greater than a predetermined threshold. In some embodiments, the predetermined threshold is about 2 volts.

Some embodiments disclose a battery charging system comprising a hub comprising a plurality of charging/discharging ports configured to apply varying charging programs to a plurality of batteries based on a characteristic of the plurality of batteries and a central server; wherein the hub and the central server are configured to communicate with each, and wherein the communication comprises information regarding the quantity and quality of the batteries at the hub and/or the at least one remote unit.

In some embodiments, the battery charging system comprises at least one remote unit configured to vend and receive batteries, wherein the remote unit is configure to communicate with the hub and the central server.

In some embodiments, the hub comprises a charging unit and a control unit.

In some embodiments, the charging unit is configured to sense a characteristic of a battery and select a charging program based on the sensed characteristic.

In some embodiments, the hub communicates information relating to the selected charging program.

In some embodiments, the charging program comprises charging at a first voltage or current for a first period of time and charging at second voltage or current for a second period of time.

In some embodiments, the hub is located within the at least one remote unit, and the at least one remote unit comprises an electro-mechanical system for placing received batteries into one of the plurality of charging/discharging ports of the hub.

In some embodiments, the system further comprises a pre-charging buffer and a post-charging buffer, wherein the pre-charging buffer is configured to receive and store received batteries within the at least one remote unit where the plurality of charging/discharging ports are occupied by batteries, and wherein the post-charging buffer is configured to receive charged batteries which have been charged and removed from the charging/discharging ports of the hub.

Some embodiments describe a method of managing rechargeable batteries comprising providing a battery charging hub as described herein; inserting at least one battery into at least one charging/discharging port; initiating a charging program comprising at least a first parameter and a second parameter; charging at a first parameter for a first period of time; charging at a second parameter for a second period of time; and communicating to a remote unit the state of charge and quantity of batteries in the hub.

In some embodiments, the first and second parameters comprise a first and second voltage or a first and second current.

In some embodiments, the hub comprises a charging unit configured to sense at least one characteristic of a battery and select the charging program for the battery based on the sensed characteristic.

In some embodiments the method further comprises simultaneously charging at least two batteries with at least two different charging programs.

In some embodiments, the method further comprises initiating a battery rejuvenation program.

In some embodiments, the battery rejuvenation program comprises repetitively charging, discharging, and recharging the battery until the battery reaches a desired capacity or a predefined set of characteristics.

In some embodiments, the method further comprises applying a current pulse to the device; and measuring a voltage spike resulting from the application of the current pulse.

In some embodiments, the method further comprises identifying the device as rechargeable when the measured voltage spike is less than a predetermined threshold.

In some embodiments, the method further comprises identifying a battery as non-rechargeable when the measured voltage spike is greater than a predetermined threshold.

In some embodiments, the predetermined threshold is about 1.5 volts.

In some embodiments, the predetermined threshold is about 2 volts.

Some embodiments described are a method of providing a virtual disposable battery comprising receiving one or more batteries having each having an initial state of charge; measuring the voltage, impedance, current, and capacity of each of the one or more received batteries;

determining a charging profile for one of the one or more batteries based on the measured voltage, impedance, current, and capacity of the one of the one or more batteries; and charging the one of the one or more batteries according to the charging profiles resulting in the one of the one or more batteries having a second state of charge.

In some embodiments, the one or more batteries are received from a battery exchange machine.

In some embodiments, the battery exchange machine provides the one of the one or more batteries having the second state of charge.

In some embodiments, the method further comprises providing one or more second batteries having the second state of charge in response to receiving the one or more batteries.

In some embodiments, the one or more charged batteries having the second state of charge are subsequently provided in response to a user providing one or more spent batteries.

DETAILED DESCRIPTION

Figure 1:
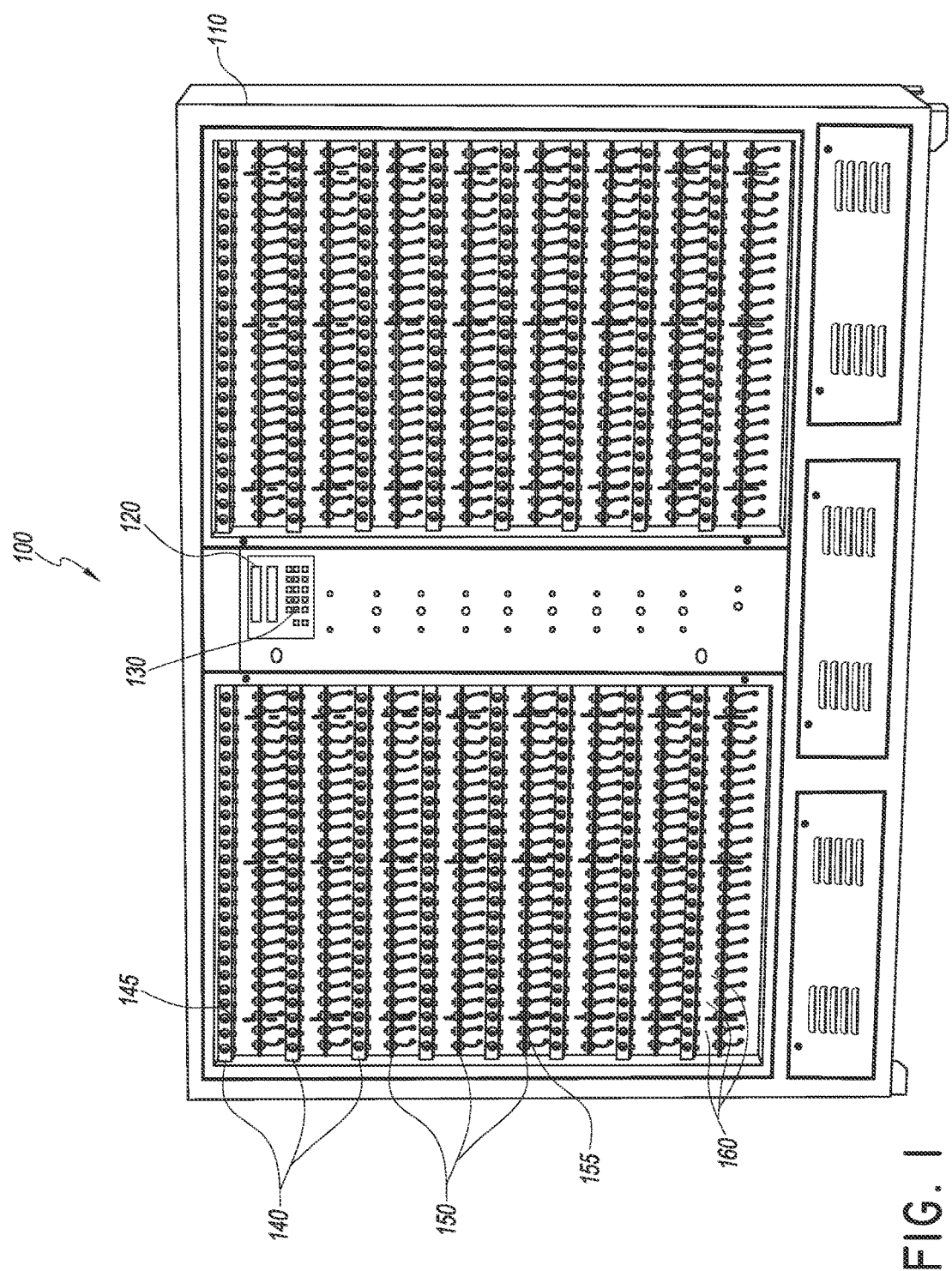
FIG. 1 depicts an view of an embodiment of a battery charging hub.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein relate to a hub configured to charge, discharge, and/or recharge rechargeable batteries or other devices under charge. A device under charge may comprise a battery, a rechargeable battery, a battery with multiple cells, rechargeable battery packs, power modules, including power modules with integrated or embedded control circuitry. As used herein, the term battery may include any of the devices under charge described herein. The devices under charge may have a variety of form factors, including cylindrical, round, rectangular, etc. In some embodiments, the hub may comprise a variety of features in a variety of combinations. In some embodiments, the hub may comprise multiple ports for charging or recharging batteries. The ports may be sized or otherwise configured to accept a variety of battery sizes or types. In some embodiments, the hub may comprise a control unit configured to manage the operation of the hub. In some embodiments the control unit is configured to provide varying charging programs depending on the state of the batteries being charged. In some embodiments, the hub may comprise the ability to communicate with remote battery vending units or storage units. In some embodiments, the hub may comprise the ability to communicate with a central server location. In some embodiments the hub may communicate via a land-line telephone network, a cellular telephone network, a local area network (LAN), a wide area network (WAN), Bluetooth, a IEEE 802.11 standard network, or other network. In some embodiments, the hub may be hardwired to other units. In some embodiments, the hub may initiate or receive communications regarding the status of batteries in the hub or remote units, the wellness of batteries in the hub or remote units, the availability of batteries for remote units, and other communications for ensuring battery wellness and availability.

Some embodiments disclosed herein relate to methods of operating a charging hub, including methods of charging, discharging, and recharging one or more batteries at the same time, and/or rejuvenating multiple exhausted batteries. Some embodiments can include a variety steps performed in a variety of orders. Some embodiments can include more or fewer steps than those specifically outlined herein. In some embodiments, the steps outlined herein can be supplemented by additional steps. In some embodiments, methods of charging or recharging batteries may include, for example, determining a battery's state of charge, determining a battery's voltage, its current, determining a battery's internal resistance, adjusting the charging profile according to a battery's state of charge, current, voltage and/or internal resistance, and providing notification regarding the status of a battery, and/or any other desired steps.

The present disclosure, for simplicity, refers frequently to batteries. It will be apparent to one of skill in the art that batteries may also refer to any device under charge, such as battery packs, power modules, and others, as described herein, and that the present disclosure is not limited to commonly known batteries.

A hub as disclosed herein can be configured to accommodate and charge a variety of batteries. For example, in some embodiments, a hub is configured to receive and charge AAA, AA, C, D, 9-volt, a battery pack, a power module having battery cells and internal circuitry, or any other type of battery. A hub as disclosed herein may be configured to accept and charge many batteries at the same time.

Referring to the drawings, FIG. 1 depicts an embodiment of a hub 100 configured to accept and charge a plurality of batteries at once. As depicted, hub 100 comprises a cabinet 110, a display 120, an input device 130, a control unit (not shown), a charging/discharging unit (not shown) and at least one charging/discharging port 160. In some embodiments hub 100 may comprise 2 or more charging/discharging ports. In some embodiments, hub 100 may comprise 1, 5, 10, 20, 30, 40, 50, 60, 70, 80, 90, 100, 200, 300, 400, 500, 600, 700, 800, 900, 1000 or any other desired number of charging/discharging ports. A charging/discharging port may be any standard charging port, including conductive terminals or contacts charging rechargeable batteries. In some embodiments, charging/discharging ports may be a standard or proprietary port such as miniDV, USB, microUSB, HDMI, and others known in the art. In some embodiments cabinet 110 houses all the components, including, but not limited to, software, hardware, structural pieces, and units involved in the function of hub 100. Cabinet 110 comprises a power connection (not shown) which can be configured for electrical connection of an external power source to the components of hub 100 and may be the source of power for charging batteries in hub 100. Cabinet 110 provides structural support for the components of hub 100, and provides protection for the internal electric and electronic systems from outside elements as well as protection for people and items from the electric and electronic components housed within cabinet 110. Cabinet 110 houses display 120. Display 120 is electrically coupled to the control unit. Display 120 displays various messages, warnings, or other indications regarding the health of hub 100 or batteries being charged therein. Display 120 also displays messages regarding network communication, resources, or other messages relating to communication received from remote vending or storage units, or from a central server. Display 120 may display text, icons, graphical information, audible indications, or other information. Display 120 also comprises indicator lights, which may be LED, incandescent, fiber optic, or other suitable light indications. These indicator lights may provide information regarding the status of charging or the completion of charging. Indicator lights may also warn when a battery is exhausted or in any other condition.

Input device 130 is electrically connected to the control unit, and is configured to accept input via a keypad, number pad, mouse, serial or parallel connection, or wireless connection. Input device 130 may accept programming instructions, messages, input for charging programs, or other information which the control unit requests, or which instruct the control unit to take a certain action or change operation. Charging programs can include any combination of charging procedures under various conditions. For example, charging programs may be constant current, constant voltage, or other program having a set duration or time interval. Discharging programs may similarly be constant current, constant voltage, or otherwise. Charging programs may comprise test and measuring steps where the properties of the device under charge are measured to ensure the charging or discharging program is proceeding properly, or whether the charging program needs to be updated based on the characteristics of the device under charge.

Hub 100 comprises a charging/discharging port 160. Charging/discharging ports 160 may have both charging and discharging capabilities, depending on the requirements of each battery or device under charge. The charging/discharging ports 160 of hub 100 are configured such that a battery inserted into a charging/discharging port 160 will be in electrical contact with a positive terminal bar 140, and a negative terminal bar 150. The terminal bar is not necessarily entirely or partially made of an electrically conductive material. In some embodiments, a terminal bar may be a conductive material comprising individual terminals in electrical contact with each other. In some embodiments, terminal bar may refer generally to an array of terminals, and need not be a particular physical component. In some embodiments, hub 100 may comprise a plurality of positive terminal bars 140 and a plurality of corresponding negative terminal bars 150. Positive terminal bar 140 comprises at least one individual positive terminal 145 and negative terminal bar 150 comprises at least one individual negative terminal 155. In some embodiments, positive terminal bar 140 may comprise a plurality of positive terminals 145. In some embodiments, positive terminal bar 140 may comprise as many positive terminals 145 as there are charging/discharging ports 160 in hub 100. In some embodiments, negative terminal bar 150 may comprise as many negative terminals 155 as there are charging/discharging ports 160 in hub 100.

Figure 4:
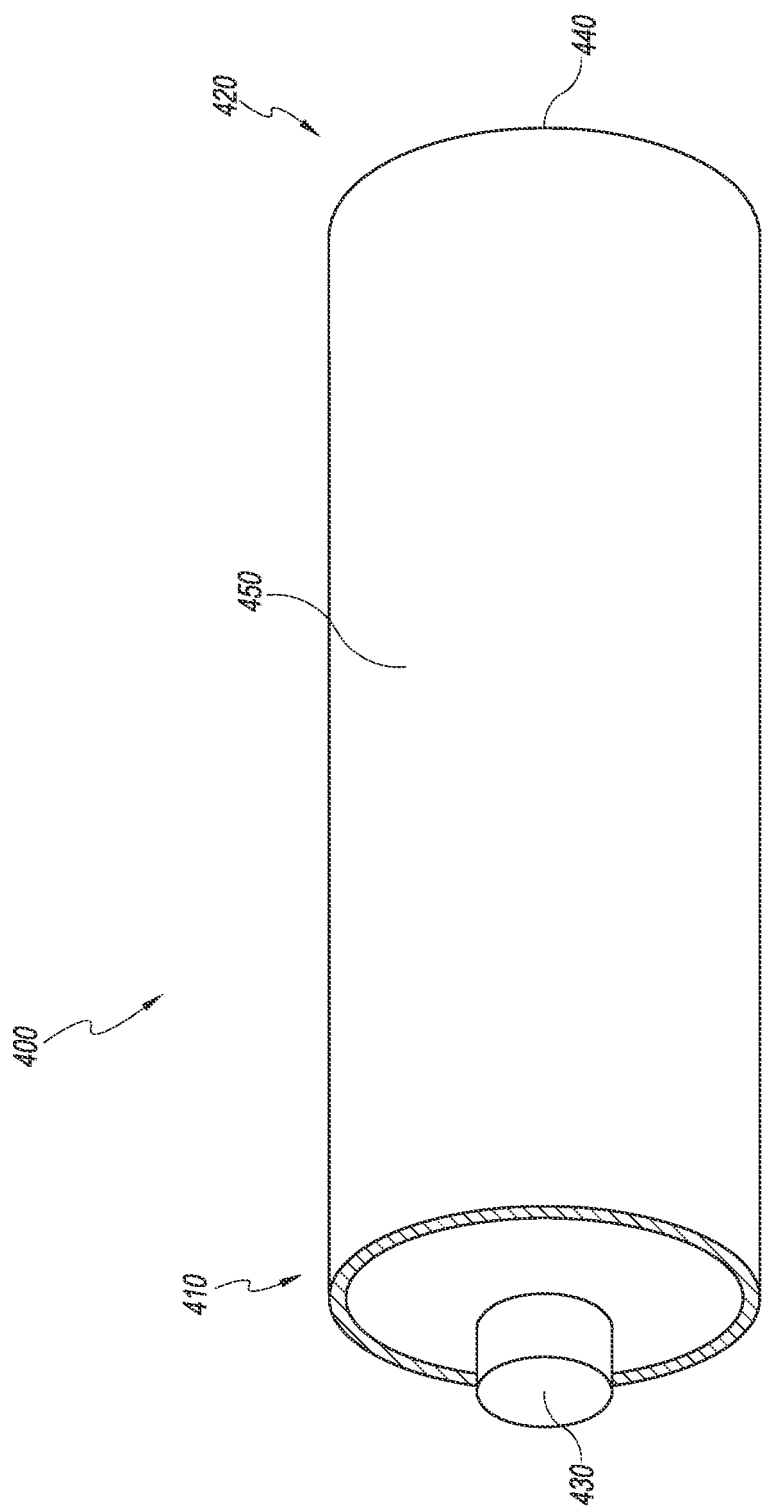
FIG. 4 depicts a perspective view of an embodiment of a rechargeable battery.

Positive terminals 145 and negative terminals 155 may be in direct physical contact with, as depicted in FIG. 4, a first terminal 430 and a second terminal 440 of a device under charge, such as a battery. A positive terminal 145 may be wired in a single electrical circuit with a corresponding negative terminal 155. Each positive terminal 145 may have a corresponding negative terminal 155. The electrical circuit comprising each positive terminal 145 and corresponding negative terminal 155 may further comprise electrical connections to a charging unit. As used in this section, the designations positive terminal and negative terminal do not necessarily indicate that the voltage at the positive terminal must be positive or that the voltage at the negative terminal must be negative.

The designations positive and negative when referring to terminals on hub 100 may indicate either the polarity of voltage at a particular terminal. The terms may indicate which terminals on hub 100 correspond to the positive and negative terminals of a battery. For example, positive terminal 145 does not necessarily have a positive polarity. Positive terminal 145 may correspond to the positive terminal of a battery, and be the terminal with which the positive terminal of a battery makes electrical contact which charging.

Positive terminal bar 140 and negative terminal bar 150 are configured such that a battery is able to be releasably retained between positive terminal bar 140 and negative terminal bar 150. For example, the positive terminal 145 or the negative terminal 155, or both, may exert a spring force on the terminal of a device under charge, thereby providing a retaining force. In some embodiments, the charging port 160 may have a retaining element which engages the device under charge and retains the device under charge in the charging port 160. Referring to FIG. 4, a battery 400, comprises a first end 410 and a second end 420 and a can 450. First end 410 comprises a first terminal 430 and second end 420 comprises a second terminal 440. In some embodiments, charging/discharging ports 160 may be configured to correspond in shape and size to the shape and size of can 450. This configuration may allow for charging/discharging ports 160 to accept and releasably retain a battery 400. Can 450 of battery 400 may have various shapes and sizes, depending on the battery type. Although a generally cylindrical battery is depicted in FIG. 4, a person of skill in the art will understand that charging/discharging port 160 may be configured in size and shape to accommodate the shape and size of can 450 having any form factor.

In some embodiments, positive terminal 145 is configured to accept and make electrical contact with either first terminal 430 or second terminal 440. For ease of discussion, it is assumed that first terminal 430 corresponds to the positive terminal on the battery, although this may not always be the case. In some embodiments, positive terminal 145 makes electrical contact with first terminal 430, and negative terminal 155 makes electrical contact with second terminal 440. Positive terminal 145 or negative terminal 155 may comprise a spring or other flexible member to ensure positive contact between the terminals on hub 100 and the terminals of battery 400, and to releasably retain battery 400 between positive terminal 145 and negative terminal 155 within charging/discharging port 160. In some embodiments, hub 100 may comprise a plurality of positive terminal bars 140 and a plurality of negative terminal bars 150. In some embodiments, hub 100 may comprise from 2 to about 20 positive terminal bars 140 and a corresponding number of negative terminal bars 150. In some embodiments hub 100 may comprise more than 20 positive terminal bars 140 and a corresponding number of negative terminal bars 150. Some embodiments can include any desired number of positive terminal bars 140 and any desired number of negative terminal bars 150. In some embodiments, there can be an equal number of positive terminal bars 140 and negative terminal bars 150. The number of positive and negative terminal bars is not limited.

FIG. 1 depicts a hub 100 configured such that batteries, when being charged, have a vertical orientation. It will be understood by those skilled in the art that the depicted orientation is illustrative. Other arrangements are possible, for example, terminal bars may be arranged generally vertically so that the batteries being charged are arranged horizontally. Positive terminal bars 140 and negative terminal bars 150 may be configured or arranged in varying dimensions and geometries. For example, the positive terminal bars 140 may be arranged generally vertically, diagonally, or any other suitable configuration. As depicted, positive terminal bars 140 are arranged substantially parallel to each other. In some embodiments, positive terminal bars 140 may be arranged in the same plane, in separate planes, perpendicularly, and in other arrangements. As depicted, negative terminal bars 150 are arranged parallel to a corresponding positive terminal bar 140. This arrangement may be used, for example, when charging a battery wherein the first terminal 430 and second terminal 440 are at opposite ends of battery 400, such as with a AAA, AA, C, or D battery. In some embodiments, for example, when charging a standard 9 volt battery, the positive terminal bar 140 and negative terminal bar 150 may be configured such that the first terminal and second terminal of the 9-volt battery spatially correspond to positive terminal 145 and negative terminal 155.

In some embodiments, charging/discharging ports 160 may comprise a plurality of individual charging cords (not shown) having a standard or proprietary charging/discharging connection. For example, charging/discharging ports 160 may comprise a plurality of cords having USB connectors configured to charge devices capable of receiving a USB connection. In these embodiments, the device under charge may be an electric or electronic device comprising a USB port for charging. In some embodiments, the device under charge may have a miniDV, microUSB, HDMI, or other type of connection known in the art. In some embodiments, the device may be a portable supplemental battery power source.

Figure 2:
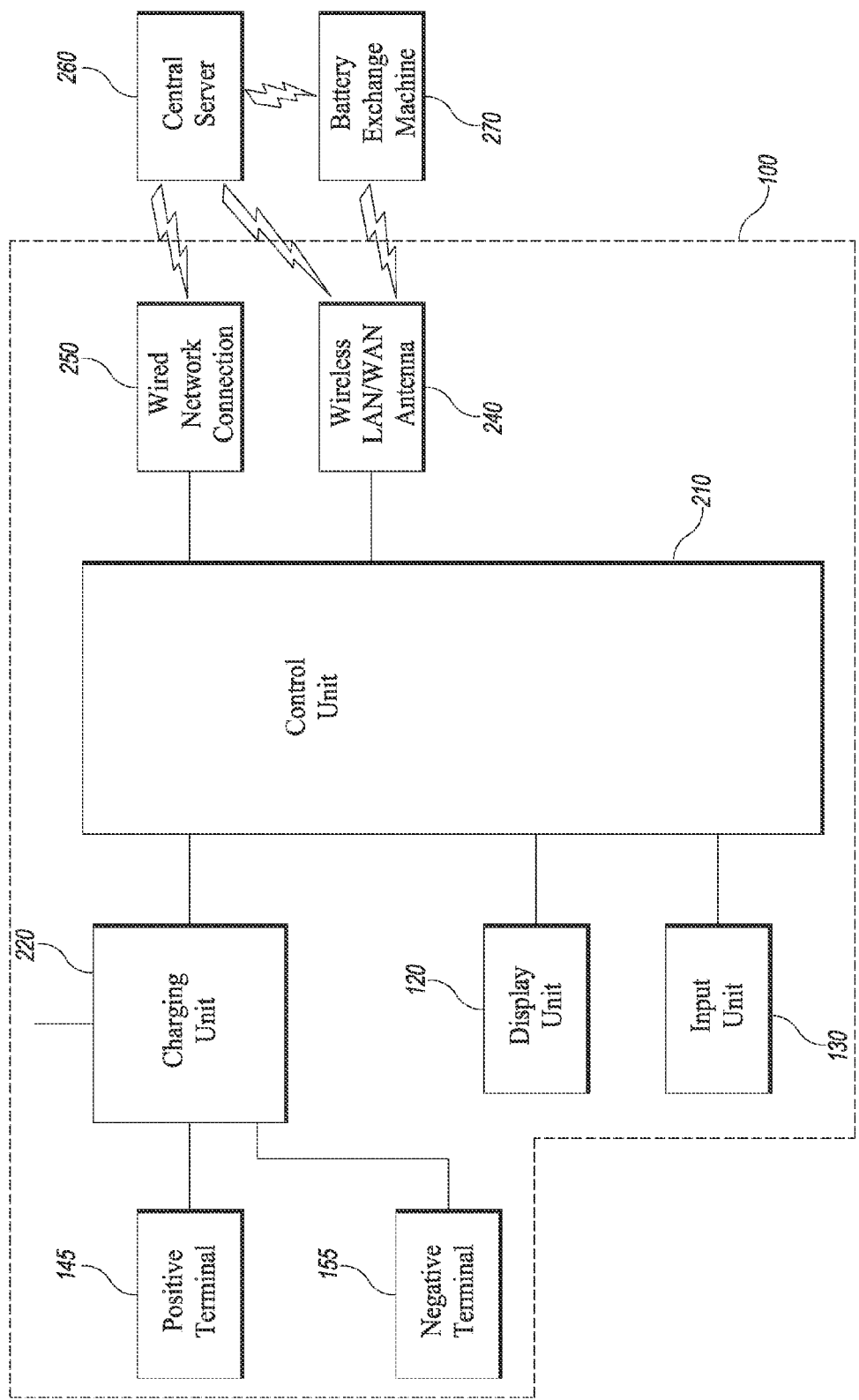
FIG. 2 depicts a schematic view of an embodiment of a battery charging hub.

In some embodiments, hub 100 may comprise individual electrical connections to positive terminals 145 and negative terminals 155 from a charging unit. Referring to back to FIG. 2, a positive terminal 145 and a corresponding negative terminal 155 may be individually connected to a charging unit 220. Charging unit 220 may be configured to provide an individualized charging program to each battery.

In some embodiments, charging unit 220 may be electrically connected to positive terminals 145 and negative terminals 155 in charging zones such that a particular charging program may be applied to a plurality of batteries in an identified zone at the same time. In some embodiments, a charging program may be applied to an individual positive terminal 145 or an individual negative terminal 155. In some embodiments, a charging program may be applied to a pair of a positive terminal 145 and its corresponding negative terminal 155, to charge one battery. The charging zones may comprise a single set of positive and negative terminal bars, 140 and 150. In some embodiments, a pair of terminal bars may comprise a single electric circuit in electrical communication with charging unit 220. In some embodiments, the positive terminal bar 140 is electrically conductive, and the corresponding positive terminals 145 may be at the same voltage, based on the voltage applied to positive terminal bar 140 from charging unit 220. Hub 100 may comprise one or more charging zones wherein each battery within the charging zone experiences the same charging program.

In some embodiments, the charging unit 220 may be configured to sense or determine characteristics of each battery which is in contact with a positive terminal 145 and a corresponding negative terminal 155. As a battery is inserted into charging/discharging port 160 and first terminal 430 contacts positive terminal 145 and second terminal 440 contacts negative terminal 155, charging unit 220 may sense one or more characteristics about the battery in charging/discharging port 160. For example, charging unit 220 may sense the voltage, current, internal resistance, or other property of the battery. Charging unit 220 is in communication with control unit 210. Charging unit 220 may generate signals which are sent to control unit 210, and control unit 210 may make determinations about the battery's wellness, state of charge, or which charging program the battery should experience. Control unit 210 may select which charging program is appropriate for a particular battery based on the sensed characteristics and direct charging unit 220 to initiate the selected charging program.

Control unit 210 may control or direct varying charging programs selected based on a charging zone, a battery's voltage, internal resistance, current output, or other battery property. For example, as a battery charges and its terminal voltage rises, the charging rate diminishes if the charging voltage is constant. Control unit 210 may identify the state of charge of a battery in a charging/discharging port 160, and customize a charging program with a varying charging voltage profile. There are many ways to charge a battery according to a charging program, which depend on the initial characteristics of the battery. For example, a battery with a voltage in the range of 0.3 V to 0.5 V would undergo a charging program comprising establishing and maintaining a first charging voltage of about 1.32 V for about 30 minutes, then adjusting the charging voltage to a second charging voltage of about 1.45 V for about 2 hours. Or, for a NiMH rechargeable battery with 2000 mAh capacity, the battery may be charged at a "constant current" of 1000 mA for 2 hours, then, at 200 mA for 1 to 2 hours. This is a two-stage, constant current or CI charging algorithm. As another example, a lithium ion battery could use a constant-current (CI) and constant-voltage (CV), two-stage algorithm where the CI phase terminates upon reaching a specific voltage such as 4.6V, then, the CV phase begins at 4.6V and terminates when the charging current drops below a certain level (e.g. 100 mA). This is an example of a two-stage CI/CV algorithm. Charging programs may have any combination of CI, CV or both in any number of stages. Also, a charging program may have a repeating sequence of procedures in a program loop. An aged, exhausted, or depleted battery (where the battery's voltage is close to 0V due to being shorted or heavily loaded for a prolong period of time) can then be restored to the normal functional state by applying any appropriate charging program or programs.

In some embodiments, control unit 210 may be configured to apply multiple simultaneous charging programs to multiple different batteries. In this context, simultaneous charging programs may mean charging programs that are ongoing at the same time, but do not necessarily need to start or end at the same time. For example, a first battery in a first charging/discharging port 160 may be experiencing a first charging program when a second battery is inserted into a second charging/discharging port 160. The control unit 210 may select a second charging program based on the charging zone or the characteristics of the second battery, and direct charging unit 220 to apply the second charging program to the second battery. These charging programs may both be ongoing at the same time. In some embodiments, control unit 210 may select the same charging program for different batteries, and start the same charging program at different times, corresponding to the times the batteries were inserted into charging/discharging ports 160. In some embodiments, batteries having similar characteristics may be inserted into charging/discharging ports 160 at different times, and the control unit 210 will delay starting a charging program until a specified number of batteries have been inserted, and will charge the similar batteries at the same time. In some embodiments, the control unit 210 may adjust the start or end time of batteries based on external factors such as the availability of electricity for charging at the hub 100, the price of electricity, energy efficiency concerns, time of day, or other any other desired factor.

In some situations battery voltage, internal resistance, current, or other property may be determined to be at a level indicating that the battery in charging/discharging port 160 is exhausted. Where a battery is detected to be exhausted, control unit 210 may select a battery rejuvenation program. A battery rejuvenation program may comprise allowing the battery to discharge for an extended period of time and applying a low voltage or low current charge for an extended period of time. The battery rejuvenation program will rejuvenate the battery such that it will substantially regain its operating characteristics, and can be potentially be reused if, for example, the battery capacity is within a predetermined range or above a predetermined minimum number. One method of battery rejuvenation involves discharging the battery, charging the battery to a predetermined state of charge (determined, e.g., by reaching a particular battery voltage), then charging, discharging, and recharging the battery while measuring the total charge taken by the battery (for example, mAh absorbed by the battery) or alternatively, the total discharge capacity of the battery. This is repeated 1, 2, 3, or more times, until the battery reaches a state of maximum capacity or maximum charge absorption. Alternatively, a capacity curve can be determined by the rate of change of capacity after 3 or more discharge-charge cycles to determine at what discharge-charge cycle number the battery will reach a predetermined capacity (either an absolute capacity, e.g., 2000 mAh, or a percentage of the predicted maximum capacity from the capacity curve, such as at least 70%, 75%, 80%, 85%, 90%, 95%, or 100% of the predicted maximum capacity. If the predicted or measured maximum capacity is below a predetermined threshold number, such that the maximum capacity is substandard, the control unit can indicate that the battery should be disposed of rather than dispensed to a customer. The battery rejuvenation may be comprised of a combination of CI, CV or other routines in a number of stages or loops, similar to the charging programs described elsewhere herein.

Figure 3:
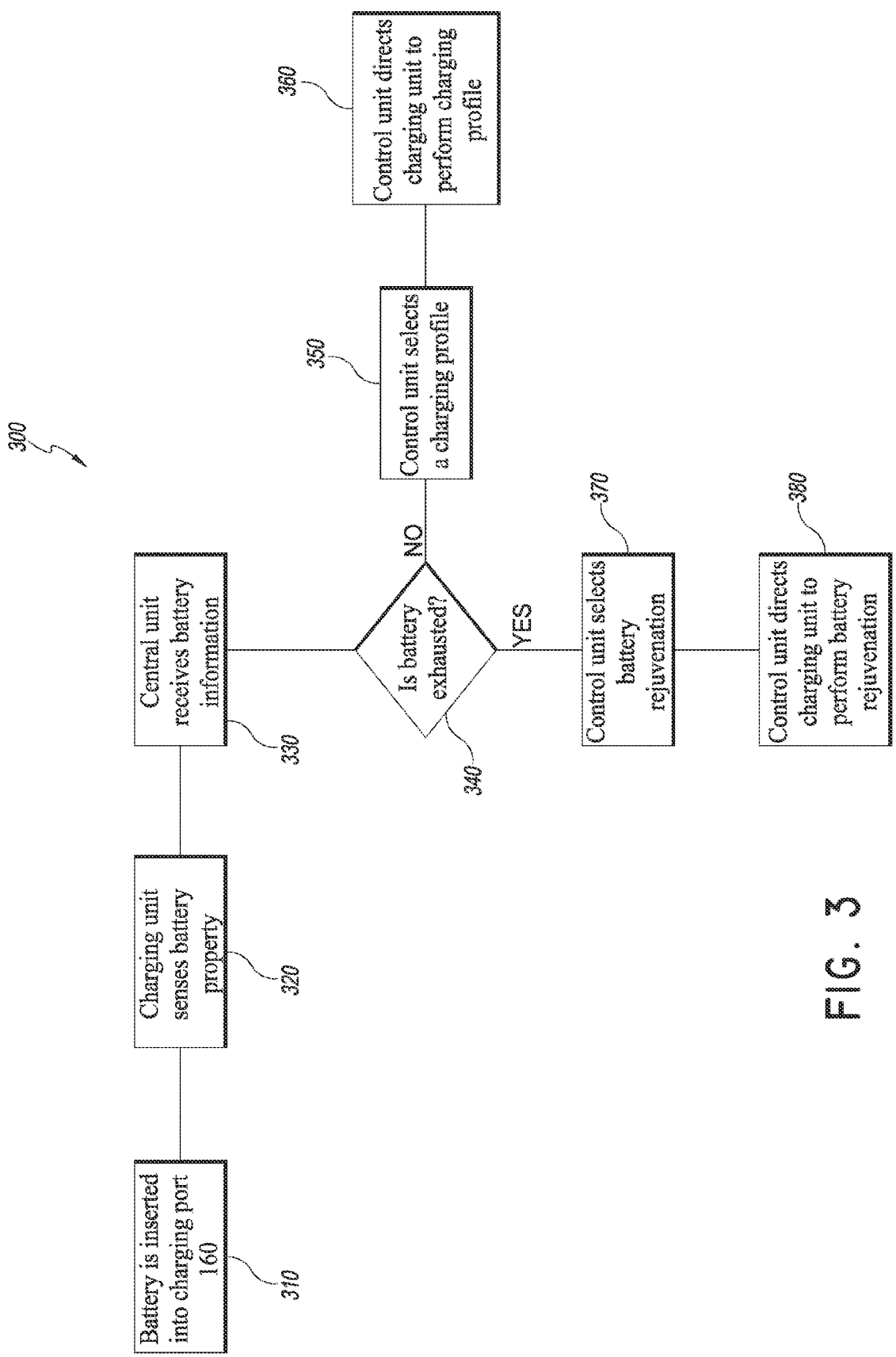
FIG. 3 is a flow chart illustrating one embodiment of a method of operating a battery charging hub.

FIG. 3 depicts one embodiment of a method 300 of operating hub 100 to receive and charge rechargeable batteries. In some embodiments, method 300 begins when a battery is inserted into charging/discharging port 160 as depicted in block 310. In block 320, charging unit 220 may sense the battery's properties, including terminal current, voltage, and internal resistance and transmits these properties to the control unit 210. Control unit 210, in block 330, may receive the battery properties and determine a charging program appropriate for the battery having the sensed properties. In block 340, control unit 210 determines, based on received properties, whether the battery is exhausted. If the battery is not exhausted, the process 300 moves to block 350, where the control unit 210 selects a battery charging program based on the received battery properties. If the battery is not exhausted or depleted, control unit 210 determines that no charging program is necessary (not shown), and the battery or device under charge is prepared for later use. In block 360, control unit 210 provides the charging program to charging unit 220 for execution. If, in block 340, the battery is exhausted the process 300 moves to block 370, where the control unit 210 selects a battery rejuvenation program. In block 380, control unit 220 instructs charging unit 210 to perform a battery rejuvenation program.

In some embodiments, the operation of hub 100 may be modified, changed, or programmed via input unit 130. For example, in some embodiments, a charging program may be selected from a list of pre-set charging programs via input unit 130. In some embodiments, the details of the charging program may be input via input unit 130. In some embodiments, a user may change the number of charging zones or input the type of battery being charged via input unit 130. A battery rejuvenation program or other charging program may be selected via input unit 130. Battery voltage, internal resistance and current measurements may be input via input unit 130, and these input values may direct control unit 210 to select a particular charging program charging.

In some embodiments, a hub 100 may comprise a network communications unit. The network communications unit can be configured to communicate with another entity on a network. In some embodiments, the network communications module can be configured to communicate with a server across a network, such as, for example, across the internet, and can include features configured for wired or wireless communication.

Referring again to FIG. 2, in some embodiments, hub 100 may be in communication with other devices, such as other hubs, one or more battery exchange machines 270, a central server 260, or other device. Hub 100 may communicate via a wired local area network (LAN), wide area network (WAN). IEEE 1394 interface, or other wired method, using wired network unit 250. Hub 100 may communicate via a wireless LAN or WAN, the internet, a cellular network, Bluetooth®, 802.11 standard, infrared, RF, or other wireless communication method, using wireless antenna 240. Hub 100 may communicate with another hub to relay and/or receive information regarding the quantity and wellness of available batteries in the hub in order to request additional resources or to provide inventory information. Hub 100 may communicate with central server 260, which, in turn, is in communication with other hubs, battery exchange machines, and other similar devices. Central server 260 may control communications between remote units such as hubs and battery exchange machines, requesting inventory and battery quality information. In some embodiments, hub 100 may initiate communications with central server 260.

In some embodiments, hub 100 is configured to communicate with one or more communication-capable battery exchange machines 270. Battery exchange machine 270 may be a two-way vending machine as described in U.S. Patent Application Ser. No. 61/560,672, the entire contents of which are hereby incorporated by reference. In some embodiments, the battery exchange machine 270 can comprise a battery exchange capsule, such as in, for example, a subscription based rechargeable battery vending machine. In some embodiments, the hub can be configured to communicate with a plurality of a battery exchange machines 270. Hub 100 may communicate with battery exchange machine 270 to provide information regarding the quantity of charged batteries available at hub 100, the quantity of discharged batteries at hub 100, the type (e.g., AAA. AA, C, D, 9V, etc.), and/or the wellness of batteries at hub 100. During communication, battery exchange machine 270 may provide hub 100 with information comprising the quantity and type of returned, discharged batteries stored in battery exchange machine 270. In some embodiments, communication between hub 100 and battery exchange machine 270 may be initiated by hub 100 sending requests for information. In some embodiments, communication between hub 100 and battery exchange machine 270 may be initiated by battery exchange machine 270. Battery exchange machine 270 may initiate communication with hub 100 when a pre-determined condition is reached in battery exchange machine 270. For example, when battery exchange machine 270 accumulates a pre-determined number of used, discharged, or spent batteries, battery exchange machine 270 may query hub 100 to determine if the hub 100 has capacity or room to accept and/or charge the used, discharged, or spent batteries. In response hub 100 may provide the requested information to battery exchange machine 270. In some embodiments, in response to a query from battery exchange machine 270, hub 100 may initiate communication with central server 260. Central server 260 may then query other hubs 100 and/or battery exchange machines 270 to ascertain the battery inventory across the network. The location of available battery charging capacity or space is then communicated through the network, and battery resources can be reallocated if necessary, to ensure battery exchange machines have an adequate supply of charged batteries for vending.

In some embodiments battery exchange machine 270 may comprise a subscription based machine wherein a subscriber is able to obtain fresh batteries and return used, discharged, or spent batteries. The communication between hub 100 and a subscription based battery exchange machine 270 would be similar to the communications described herein, and may include information regarding a subscriber's account, or any information a subscriber may have input into a subscription-based battery exchange machine 270.

In some embodiments, hub 100 may communicate commands or signals input via input device 130 to central server 260 or battery exchange machine 270. For example, a command may be input via input device 130 to turn on or turn off the battery exchange machine 270, or to request a status report from battery exchange machine 270.

In some embodiments, battery exchange machine 270 may comprise hub 100. Hub 100 may be configured to fit within battery exchange machine 270. Battery exchange machine 270 may comprise a robotic arm or other automated system configured to place uncharged, used, spent, or other batteries received in battery exchange machine 270, into charging/discharging ports 160 of hub 100. For example, as used, spent, discharged, etc. batteries are placed into a receptacle on battery exchange machine 270 a robotic arm, mechanical system, or electro-mechanical system may receive the batteries. The system then places the battery in the charging/discharging port 160 which corresponds to the battery type.

Communications between the hub 100 and the battery exchange machine 270 can comprise a variety of communications for different occurrences at the hub 100 or at the battery exchange machine 270. In some embodiments, communication between the hub 100 and the battery exchange machine 270 can be driven by the hub 100. Thus, in some embodiments, the hub 100 can request periodic status updates from the battery vending machine 270. In some embodiments, communications between the hub 100 and the battery vending machine 270 can be driven by the battery exchange machine 270. Thus, in some embodiments, the battery vending machine 270 can provide periodic status updates, or provide requests for service as a need arises.

Figure 5:
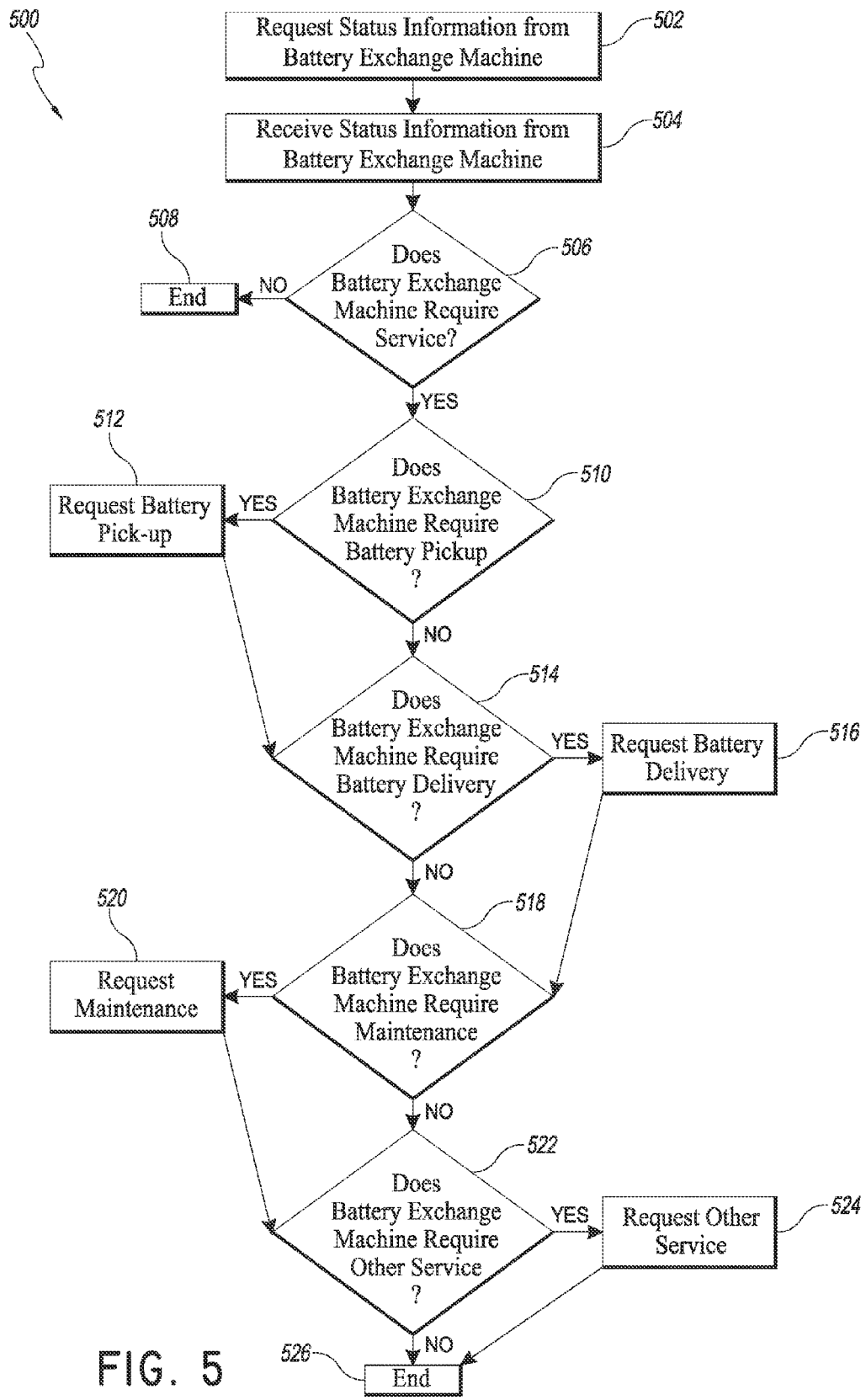
FIG. 5 depicts a flow chart illustrating one embodiment of a method of operating a battery charging hub to communicate with a machine.

FIG. 5 depicts one embodiment of a process 500 for operation of the hub 100 to communicate with one or several battery vending machines. The process 500 begins in block 502 and requests status information from the battery exchange machine 270. This request can be made in response to any prompt, including, for example, the passage of a predetermine amount of time.

The process 500 then proceeds to block 504 and receives the status information from the battery exchange machine 270. This status information can comprise an indicator of the functionality of the battery exchange machine 270 such as, for example, whether the battery exchange machine 270 is properly functioning, an indicator of inventory status of the battery exchange machine 270 such as, for example, whether additional batteries are required, whether batteries should be retrieved from the battery exchange machine 270, and whether any other vended item should be delivered to or picked up from the battery exchange machine 270.

The process 500 then proceeds to decision state 506 and determines if the battery exchange machine 270 requires service. If the battery exchange machine does not require service, then the process terminates at block 508.

If the battery exchange machine 270 requires service, then the process moves to block 506 and determines if the battery exchange machine 270 requires battery pickup. In some embodiments in which a battery exchange machine 270 can receive batteries from a user, the batteries can be stored in an inventory. In some embodiments in which the battery exchange machine 270 includes an integral charging unit, the battery exchange machine 270 can determine if the received batteries can be recharged. If the received batteries can be recharged, then they can be placed in a recharge inventory. If the received batteries cannot be recharged, or if the battery exchange machine 270 does not have a charging unit, the batteries can be placed in a pick-up inventory. When the pick-up inventory is full, the battery exchange machine can request pick-up of the batteries from the pick-up inventory.

If the battery exchange machine requests a pickup, the process can move to block 512 and can request or schedule battery pick-up.

After the battery pick-up is requested by the hub 100 in bock 512, or if the process 500 determines that the battery exchange machine 270 does not require battery pick-up in decision state 510, the process moves to decision state 514 and determines if the battery exchange machine requires battery delivery. In some embodiments, the battery exchange machine 270 can dispense batteries from a battery inventory. In some embodiments, this inventory can be replenished by the charging of received batteries in the charging unit of the battery exchange machine 270. As the charging unit may not be able to recharge all received batteries, as the battery exchange machine may not include a charging unit, and as demand may outstrip the ability of the charging unit to maintain the stock of charged batteries, in some embodiments, the inventory of batteries for dispensing can be replenished by sources outside the battery exchange machine 270. If the process 500 determines that the battery exchange machine 270 requires battery delivery, the process 500 moves to block 516 and requests or schedules battery delivery to the battery exchange machine.

After the battery delivery is requested by the hub 100 in block 516, or if the process 500 determines that the battery exchange machine 270 does not require battery delivery in decision state 514, then the process moves to decision state 518 and determines if the battery exchange machine requires maintenance. In some embodiments, the battery exchange machine can request maintenance if some or all of the software or hardware of the battery exchange machine 270 is not properly functioning. In some embodiments, for example, the battery exchange machine 270 can request maintenance if a user has tampered with, or attempted to tamper with the battery exchange machine 270. A person of skill in the art will recognize that a variety of problems relating to hardware and/or software can require maintenance, and that the present disclosure is not limited to a specific class or type of maintenance requests.

If the process 500 determines that maintenance is required, then the process 500 moves to block 520 and requests or schedules maintenance for the battery exchange machine.

After the hub 100 has requested or scheduled maintenance in block 520, or if the process 500 determines that the battery exchange machine does not require maintenance in decision state 518, then the process moves to decision state 522 and determines if the battery exchange machine 270 requires any other service, such as, for example, pick-up of received monies, delivery of money for making change, or any other potential service. If the process 500 determines that other service is required, then the process 500 moves to block 524 and requests or schedules other service. After the process 500 requests or schedules other service at block 524, or after the process determines that no other service is required at decision state 522, the process 500 terminates at block 526.

A person of skill in the art will recognize that a process 500 for operation of the hub 100 to communicate with one or several battery vending machines 270 can include some or all of the above discussed steps, as well as steps additional to the above requested steps. A person of skill in the art will further recognize that a process 500 for operation of the hub 100 to communicate with one or several battery vending machines 270 can include the above listed steps performed in any order, including in an order different than that shown above.

Figure 6:
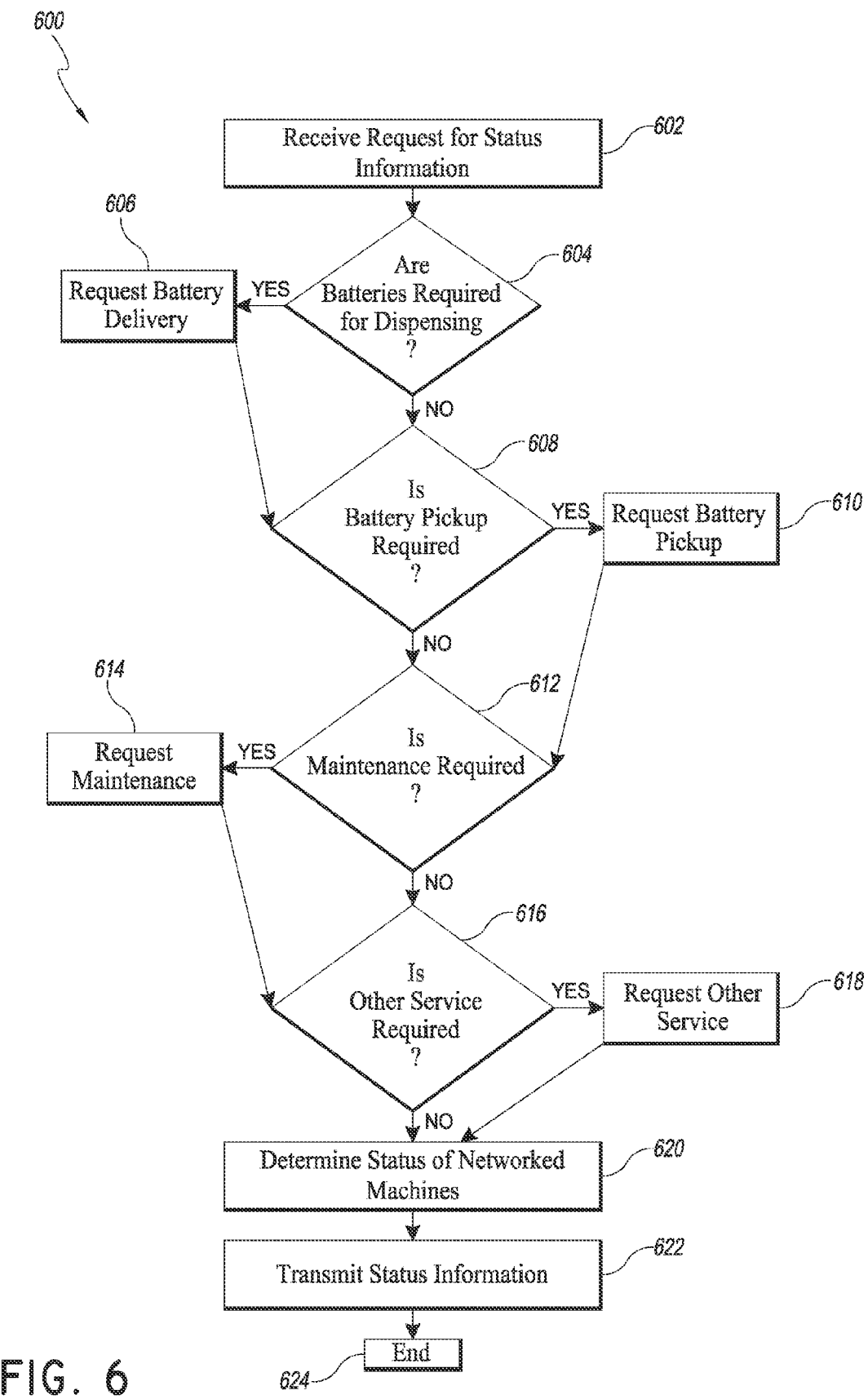
FIG. 6 depicts a flow chart illustrating one embodiment of a method of operating a machine to communicate with a hub.

FIG. 6 depicts one embodiment of the process 600 for controlling the operation of a battery exchange machine 270 to communicate with a hub 100. The process 600 begins at block 602 and receives a request for status information. In some embodiments, this request can come from a hub, from a server, from a communication station, or from another battery exchange machine 270.

The process 600 then moves to decision state 604 and determines if batteries are required for dispensing. If batteries are required for dispensing, the process moves to block 606 and requests battery delivery.

After battery delivery is requested in block 606, or if the process 600 determines in decision state 604 that batteries are not required for dispensing, the process 600 moves to decision state 608 and determines if batteries are required for pick-up. If batteries are required for pick-up, the process moves to block 610 and requests battery pick-up.

After battery pick-up is requested in block 610, or if process 600 determines that battery pick-up is not required in decision state 608, the process 600 moves to decision state 612 and determines if maintenance is required. As discussed above, maintenance can be required to resolve a variety of issues in the hardware or software of the battery exchange machine 270. If maintenance is required, then the process 600 moves to block 614 and requests maintenance.

After maintenance is requested in block 614, or if the process 600 determines that maintenance is not required in decision state 612, the process 600 moves to decision state 616 and determines if other service is required. As discussed above, this service can include removing received monies, replenishing money supplies, or any other service. If other service is required, the process 600 moves to block 618 and requests other service.

After other service is requested in block 618, or if the process 600 determines that no other service is required in decision state 616, the process 600 moves to block 620 and determines the status of networked machines. In some embodiments, for example, a battery exchange machine 270 may be in direct communication with a hub 100. In other embodiments, a battery exchange machine 270 may be in communication with a hub 100 via an interpositioned battery exchange machine 270. Thus, in some embodiments, a first battery exchange machine may request information from a second battery exchange machine, or any number of second battery exchange machines, and may further communicate received from the second battery exchange machine to the hub 100. In some embodiments, the information received by a first battery exchange machine from a second battery exchange machine can include information from one or several fourth, fifth, sixth, seventh, eighth, or any other battery exchange machines. A machine that communicates with a hub 100 via another machine is referred to as a networked machine.

After determining the status of networked machines in block 620, the process 600 moves to block 622 and transmits status information. The process 600 then terminates at block 624.

A person of skill in the art will recognize that a process 600 for controlling the operation of a battery exchange machine 270 to communicate with a hub 100 can include some or all of the above discussed steps, as well as steps additional to the above requested steps. A person of skill in the art will further recognize that process 600 for controlling the operation of a battery exchange machine 270 to communicate with a hub 100 can include the above listed steps performed in any order, including in an order different than that shown above.

Figure 7:
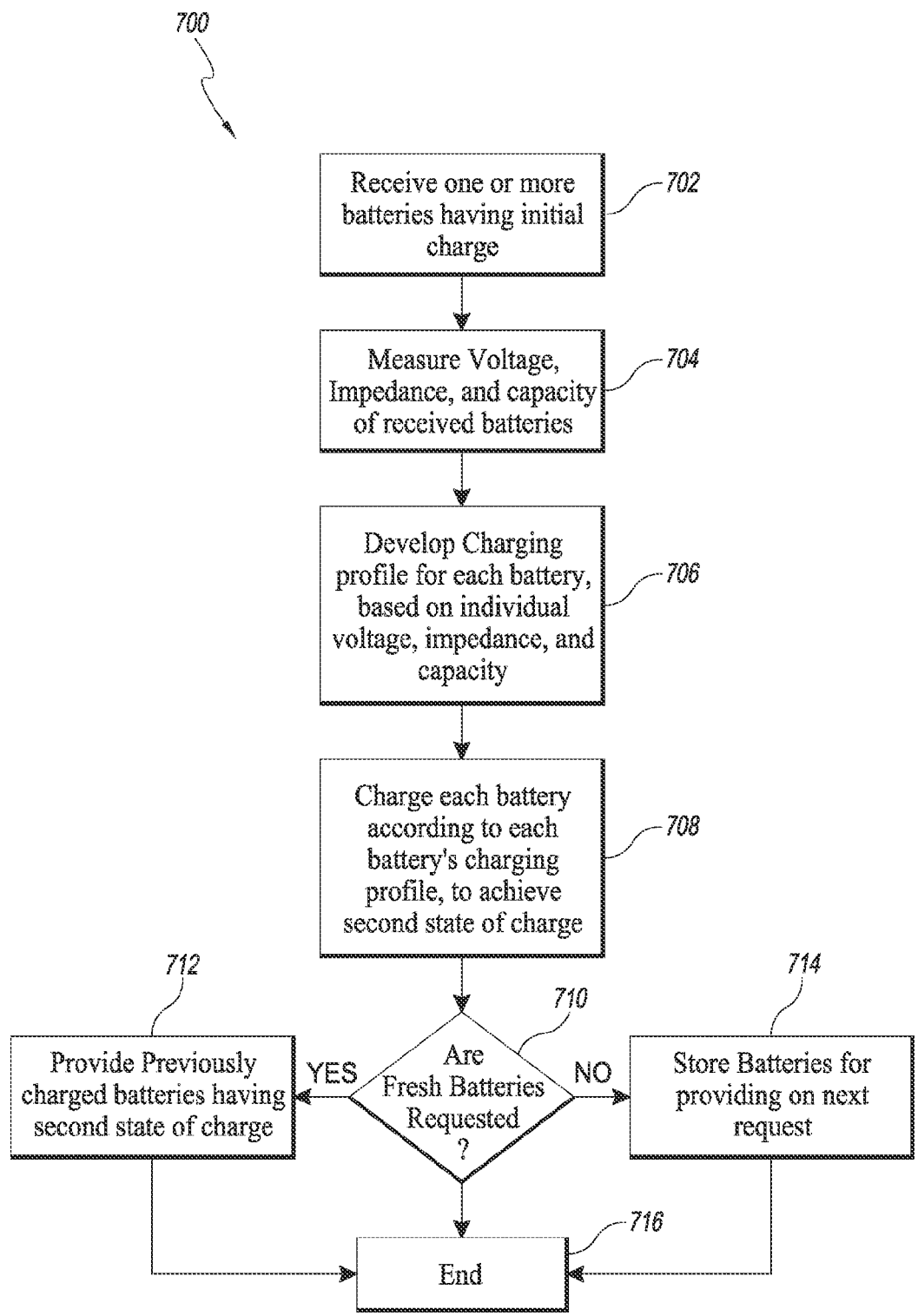
FIG. 7 depicts a method for creating a virtual disposable battery.

FIG. 7 depicts one embodiment of a process 700 for creating a virtual disposable battery. A virtual disposable battery may be a battery that, to a user, is in effect a disposable battery. Thus, a user purchases a battery, uses the energy supplied by the battery, and disposes of the battery in a location configured to receive the battery, and may be provided a fresh or charged battery. The battery is not disposed of by the battery provider (unless the battery is damaged or otherwise unusable), but is recycled or recharged for later use.

The battery can be provided to the user in a variety of ways. In some embodiments, the battery may be purchased at a store, purchased from a vending machine, delivered, or provided in any other desired way, such as mail or parcel delivery. The batteries can likewise be received from the user in a variety of ways.

In some embodiments, the battery can be deposited at the location configured to receive the battery. In some embodiments, for example, in which the battery is provided to a consumer via a vending machine, such as a battery exchange machine 270, the location configured to receive the battery can be that same vending machine. In some embodiments, the location configured to receive the battery can be, for example, a store or any other designated place for battery disposal.

In some embodiments, the user is provided a fresh, or fully charged battery. To the user, the used battery is disposed, and a new battery is received as part of an exchange transaction. The disposed battery, however, is a reusable, rechargeable battery. The battery provided the user can be, for example, previously used and recharged. The disposed battery can be received and recharged, and prepared to be provided to the next user. In this way, the batteries are virtual disposable batteries.

In block 702 of process 700, one or more batteries is received. Each of the one or more batteries may have a different state of charge. Although each battery may have a different initial charge based on, for example, its prior use or application, these various states of charge may be referred to as the initial charge or initial state of charge of the one or more batteries. In some cases, some batteries may have the same initial state of charge, and some others may have varying states of charge. The term initial state of charge may refer to the state of the battery upon receipt, and initial state of charge may include such electrical parameters as voltage, current, capacity, resistance, impedance, state of charge, and others. The one or more batteries may be received in a battery exchange machine 270 as described herein. In some embodiments, the one or more batteries may be deposited in a designated battery pick-up location. In some embodiments, the batteries may be returned or shipped to the battery supplier or manufacturer or distributor, via mail or some other similar mechanism. In some embodiments, the batteries may be retrieved by the battery supplier or manufacturer or distributor.

Once the one or more batteries are received, the process 700 proceeds to block 704 wherein several electrical properties are measured. These properties include, but not limited to, voltage, current, impedance/resistance, and capacity. In some embodiments, all three of these parameters are measured. In some embodiments of process 700, these measurement may be performed by the battery exchange machine 270 or by a battery hub 100 as described herein. In some embodiments, these measurements can be simultaneously or serially made. In some embodiments, these measurements may be made after pick-up from a designated location or receipt via the mail or other similar mechanism.

In some embodiments, the measured parameters can be used to develop a charging profile as depicted in block 706. The charging profile can be determined for each of the one or more batteries, and each battery may have an individual charging profile based on its initial charge. A charging profile for each battery is designed to either establish or restore a battery to a fresh, or fully charged state. The terms fresh and/or fully charged may not always mean that the battery is at a set voltage or capacity, but that the battery is returned to its optimally charged state based on, for example, the life characteristics of the battery. Therefore, the actual electrical parameters of a battery, e.g., voltage, amp-hours, etc., may vary based on the individual characteristics or lifespan of each battery, such that two individual fresh, or fully charged batteries may have varying electrical parameters. A battery nearing the end of its useful life may not have the same capacity or voltage or amp hour rating as compared to a new battery, but each can be considered fresh or fully charged. The charging profile may be determined by evaluating the voltage, impedance, current and/or capacity as described. The measured voltage or current may provide an indication of the state of charge and can be used to determine parameters of the charging profile. Impedance, or resistance, can be used to determine both the state of charge and the age of the battery cell. As a battery ages, its internal resistance or impedance typically increases. The impedance or resistance measurement is used to determine parameters of the charging profile. The battery capacity may provide an indication of the size of the battery, and is used to determine specific parameters for use in the charging profile.

The charging profile for each battery may be different, based upon each battery's individual characteristics. Thus, in some embodiments, the charging profiles for multiple batteries may be the same if the batteries have the same individual characteristics, or if the different characteristics of the batteries fortuitously results in the same charging profile. Once the charging profile is determined, the one or more batteries are charged according to each battery's individualized charging profile as depicted in block 708. Charging the one or more batteries may be performed in hub 100 as described herein. By utilizing hub 100, charging of one or more batteries can be concurrently accomplished, and a sufficient number of available fresh or fully charged batteries can be available. Charging continues until each battery has attained a second state of charge, the second state of charge being different from the initial charge, and which corresponds to a fresh or fully charged state. In some embodiments, the second state of charge may vary slightly from battery to battery slightly according to differences in each battery's life characteristics or manufacturing differences.

After the one or more batteries are charged according to each battery's individualized charging profile as depicted in block 708, the process 700 proceeds to decision state 710 wherein it is determined whether replacement batteries are requested. In some embodiments, the request for replacement batteries can be made in connection with the deposit of used batteries, and in some embodiments, the request for replacement batteries can be unrelated from the deposit of used batteries. Thus, in one embodiment, the determination of whether replacement batteries are requested can comprise determining whether a delivery of replacement batteries is due. The request may be from a user or other entity in response to a deposit of one or more batteries. Where a user has a subscription to a battery exchange service, or whether the user pays a one-time fee for batteries, the user may request batteries in exchange for returning used or spent batteries.

If fresh or fully charged batteries are requested, process 700 proceeds to block 712 wherein batteries that have been previously charged, according to a charging profile, to a second state of charge may be dispensed, delivered, or otherwise provided. The one or more provided batteries may be batteries that had previously been returned, and had undergone a previous iteration of process 700. Providing batteries may be done by a battery exchange machine 270 as described herein. In some embodiments, the batteries may be provided in a designated pick-up location or via mail or other similar delivery mechanism.

If batteries are not requested, process 700 proceeds to block 714 wherein batteries that have undergone charging according to the individualized charging profiles are stored under appropriate conditions such that they can be subsequently provided upon request by a user or other entity. The stored batteries may have a second state of charge.

In some embodiments, the process ends after either block 712 or 714. A person of skill in the art will understand that the above decision state 710 need not be performed in the order depicted or described here. Decision state 710 may occur at any time during the process, including prior to step 702. However, step 712 is typically not performed until after step 702, ensuring spent batteries are received before a fresh or fully charged battery is provided. A person of skill in the art will further recognize that process 700 can comprise more or fewer steps than those outlined above, and that the steps of process 700 can be performed in the same or a different order than outlined in FIG. 7 and above.

Figure 8:
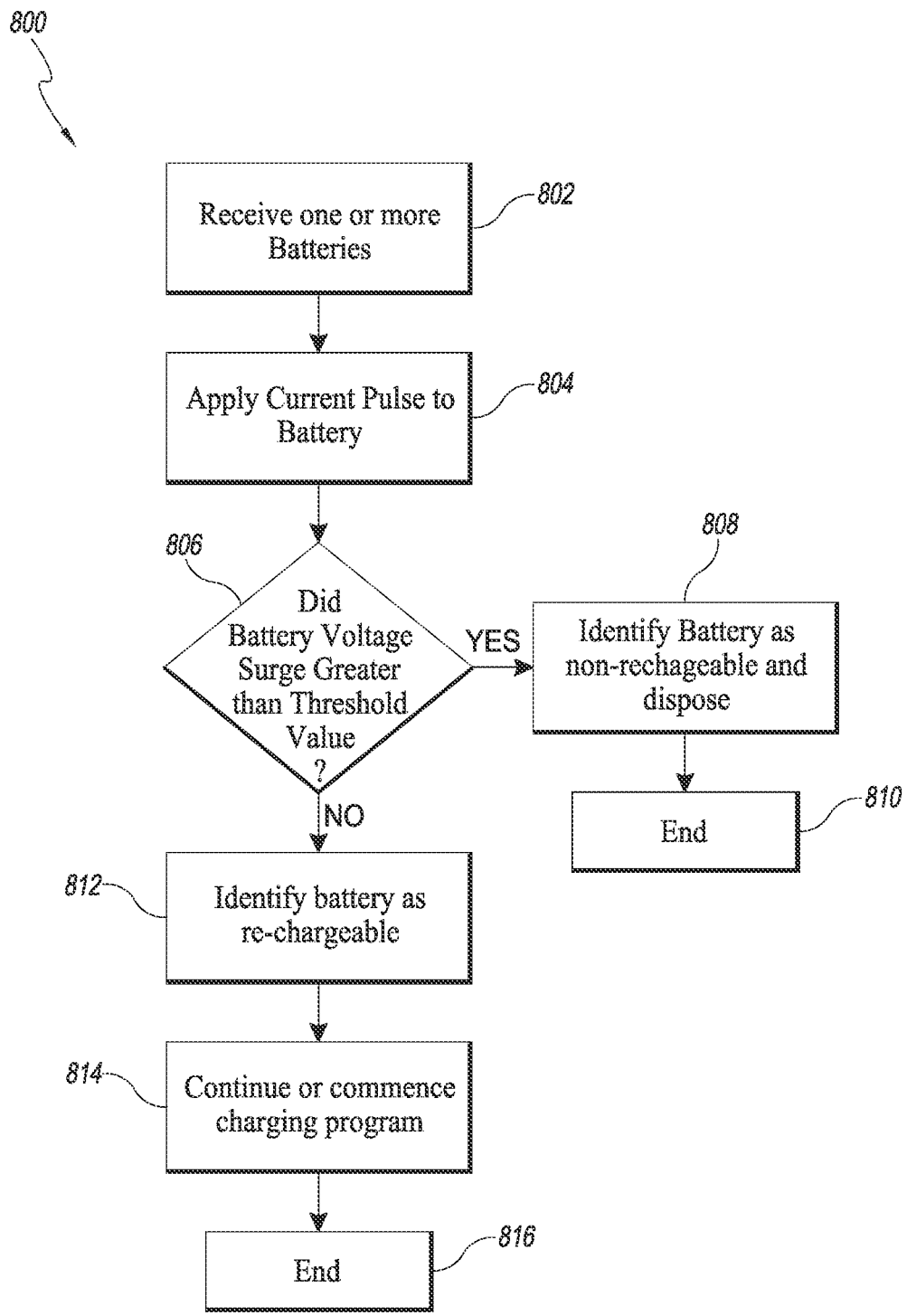
FIG. 8 depicts a flow chart illustrating one embodiment of a method of identifying a battery.

FIG. 8 depicts one embodiment of a process for identifying a battery. Charging or attempting to charge an alkaline or non-rechargeable battery may be dangerous and may damage the battery and the charging equipment. In order to ensure non-rechargeable batteries are not charged in the hub 100 or in the battery exchange machine 270, a battery identification program may be run, directed by the control unit 210 as depicted in FIG. 8. In some embodiments, process 800 is performed as part of the process 700 depicted in FIG. 7, for example, occurring as part of step 702 or between steps 702 and 704. In some embodiments, process 800 is performed at a battery exchange machine 270 or in any another location where batteries are received.

Process 800 begins in step 802, wherein one or more batteries is received. The batteries may be received into, for example, the charging/discharging port 160. The process 800 moves to step 804 wherein controller 210 applies a current pulse via the charging unit 220, the positive terminal 145 and negative terminal 155. The applied current pulse may be about 1 ampere, 1.5 amperes, 2 amperes, or more, or any value therebetween, and may last for from about 3 to about 5 seconds. During the application of the pulse, the voltage of a non-rechargeable alkaline cell may reach a voltage of greater than about 2 volts, where as a rechargeable cell, such as a NiMH cell, may remain at a voltage less than about 1.5 volts. Therefore, in some embodiments, a cell which, upon application of a current pulse, reaches a voltage of about 2 volts may be identified as a non-rechargeable cell, or as a faulty cell which need further attention or replacement. In some embodiments, the current pulse may preferably be about 2 amperes. Upon application of the current pulse, the voltage across the battery terminals is measured. The current pulse may be delivered by the charging unit 220 as directed or controlled by the controller 210. In some embodiments, the charging/discharging port 160 may include voltage sensors, as described elsewhere herein, which are configured to measure battery voltage upon application of the current pulse.

Process 800 moves to decision state 806, wherein it is determined whether the battery voltage spiked to a voltage greater than a threshold or predetermined value. In general, a current pulse applied to a battery will cause the battery voltage to rise. The resulting voltage value, or the voltage spike, may be used to determine whether the battery to which the current pulse is applied is rechargeable or non-rechargeable. For example, if the battery to which the current pulse is applied is a standard, 1.5V nominal, AAA, AA, C, or D cell alkaline, non-rechargeable battery, the battery voltage will spike rapidly to greater than about 2 volts. If the current pulse is applied to a standard, 1.5V nominal, AAA, AA, C, or D cell rechargeable battery, the voltage spike will be less than the spike for a non-rechargeable battery. For example, the voltage spike of the rechargeable battery may be about 1.5 volts or less. It will be understood that the voltage and current values described for identifying a battery are exemplary. In cases where the nominal battery voltage is different than the standard AAA, AA, C or D cell, the current pulse and voltage spike values may vary.

In some embodiments, the current pulse test may be applied to batteries having different numbers of cells, or to batteries of different types. For example, a standard 9V battery has six 1.5 volt cells. Therefore, if a current pulse as described above is applied to a non-rechargeable, alkaline 9V battery, if the voltage spike exceeds about 12 volts, the 9V battery may be identified as non-rechargeable or faulty. If the voltage spike stays below about 9 volts, then the 9V battery may be identified as a rechargeable battery. In some embodiments, the battery may be a lithium ion battery having a nominal voltage of about 3.6 volts. Upon application of the current pulse described herein to a lithium ion battery, a voltage spike exceeding about 4.5 volts may indicate a faulty or non-rechargeable battery. If the voltage spike of the lithium ion battery is less than about or equal to 3.6 volts, then the battery may be identified as rechargeable.

If the voltage upon the voltage spike was greater than a threshold value, e.g., greater than 1.5 volts or greater than 2 volts, the process moves to step 808, wherein it is determined that the battery is non-rechargeable, and the battery is removed from the charging/discharging port 160, or is otherwise disposed of. The process ends in step 810.

If the voltage upon the voltage spike was less than a threshold value, e.g., less than about 1.5 volts, the process moves to step 812, wherein the battery is identified as a rechargeable battery. The process then moves to step 814, wherein the controller 210 commences or continues a charging program according to FIG. 7, after which the process ends in step 816. During the current pulse test described herein, the age of the battery may affect the voltage of the battery upon a voltage spike. Generally, as a battery ages, the voltage spike will be greater. However, despite the age of a battery, the voltage spike of an aged rechargeable battery will normally be less than the voltage spike of a newer non-rechargeable battery.

Figure 9:
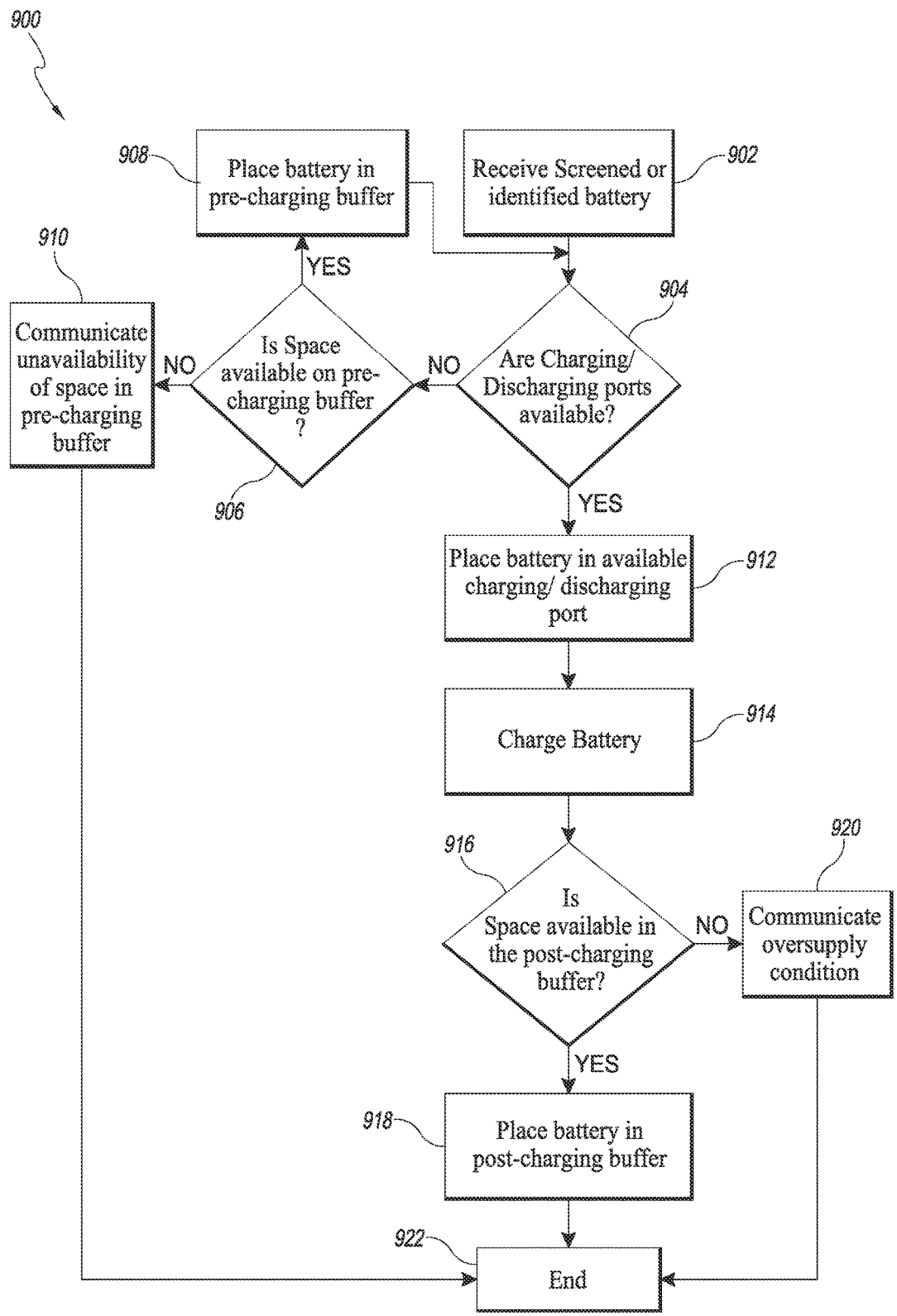
FIG. 9 depicts a flow chart illustrating one embodiment of a method of operating a charging hub.

FIG. 9 depicts an embodiment of a method for operating a charging hub. As described above, the charging hub may be located within a battery exchange machine 270. FIG. 9 describes a method to enhance and improve the efficiency of charging at a hub 100 located within a battery exchange machine 270, and to ensure sufficient quantities of charged batteries are available at the battery exchange machine 270, even if demand for batteries fluctuates. For example, the time to charge a battery according to the present disclosure will likely be less than the time the battery is in the battery exchange machine 270 before being re-vended. Thus, it is not necessary to have a charging/discharging port 160 available for each battery within the battery exchange machine 270. The controller 210 may track the number of batteries being charged/discharged and availability of charging/discharging ports 160 in order to maximize availability of charging/discharging ports 160 in the event that there is an increase in the number of batteries returned to a battery exchange machine 270. The controller 210 may also track the quantity and status of charged batteries awaiting vending, in order to maintain a minimum quantity in case there is an increase in the demand for batteries from a battery exchange machine 270.

Process 900, for charging a received battery cell begins at step 902, wherein a battery is received, which has previously been identified as rechargeable, proprietary to the owner of the battery exchange machine 270, or is otherwise identified, for example, according to process 800, or by a process or apparatus such as those described in PCT Application No. PCT/US2013/031667, filed Mar. 14, 2013, the entire contents of which is incorporated herein by reference. The battery is received into a hub 100, which may be located in a battery exchange machine 270.

The process 900 moves to decision state 902, wherein it is determined whether the hub 100 within the battery exchange machine 270 has available charging/discharging ports 160. In some embodiments, the controller 210 detects which charging ports have batteries which are undergoing charge, discharge, or rejuvenation.

If there are no empty charging/discharging ports 160, that is, all the ports contain a battery, the process moves to decision state 906, wherein the it is determined whether there is capacity available in a pre-charging buffer. The pre-charging buffer may be a queue, line, conveyor, storage area, or designated space for batteries to be placed as they await an available charging/discharging port 160 in the hub 100. The pre-charging buffer may be located within the battery exchange machine 270. The pre-charging buffer allows the battery exchange machine 270 the capability to receive and accept batteries even when the charging/discharging ports 160 are all in use, or occupied by batteries.

If there is no room in the pre-charging buffer, the process 900 moves to step 910, wherein this condition is communicated to at least a user of the battery exchange machine 270 and the central server 260.

If room is available in the pre-charging buffer, the process 900 proceeds to step 908 wherein the battery is placed in the pre-charging buffer. Once a battery is in the pre-charging buffer, the controller 210 periodically checks the status of the charging/discharging ports 160, according to step 904. When a charging/discharging port 160 becomes available, the battery is removed from the pre-charging buffer and placed in the available charging/discharging port 160, and the process 900 continues.

If a charging/discharging port 160 is available, that is, there are ports which do not contain a battery, the process moves to step 912, wherein the received battery is inserted into an available charging/discharging port 160. The battery inserted into the charging/discharging port 160 may be a newly received battery, or may be a battery taken from the pre-charging buffer and placed in the available port 160. This operation, and the other battery manipulations and movements described herein may be accomplished by a robotic arm, or combination of automated mechanical components which are configured to physically move the battery from a receiving port on the battery exchange machine 270, to the hub 100, and insert the battery into a charging/discharging port 160.

The process next moves to step 914, wherein the battery undergoes a charging program, such as process 700 depicted in FIG. 7. Upon completion of the charging program, the process 900 moves to decision state 916, wherein it is determined whether a post charging buffer is full. A post-charging buffer may be similar to a pre-charging buffer, and may provide a place or area to hold or store charged batteries until they are requested for vending or exchange at the battery exchange machine 270.

If the post-charging buffer has available space, the process moves to step 918, wherein the charged battery is placed into the post-charging buffer. If there is no available space in the post-charging buffer, the process moves to step 920, wherein the lack of available space in the post-charging buffer is communicated at least to the central server 260.

The process 900 then ends in step 922. In some embodiments, if another battery cell is received into the battery exchange machine 270, the process 900 repeats for the next battery. Generally, as batteries are received, the process 900 above may continue or be repeated until the pre-charging buffer contains no batteries to charge, or until the post-charging buffer is full.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®@, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of providing a virtual disposable battery comprising:
   receiving in a hub comprising a plurality of charging/discharging ports divided into a plurality of zones, one or more batteries from a battery exchange machine, each of the one or more batteries having an initial state of charge, wherein the charging/discharging ports of each zone are configured to receive a same charging current or charging voltage;
   measuring the voltage, impedance, and capacity of each of the one or more received batteries;
   determining a first charging profile for a first battery of the one or more batteries based on the measured voltage, impedance, and capacity of the first battery and a second charging profile for a second battery of the one or more batteries based on the measured voltage, impedance, and capacity of the second battery, wherein the first charging profile applies a different charging current and/or charging voltage than the second charging profile;
   charging in a first zone, the first battery according to the first charging profile resulting in the first battery having a second state of charge, wherein the first zone comprises at least two of the plurality of charging/discharging ports and is configured to charge a plurality of batteries according to the first charging profile; and
   charging in a second zone, concurrent with charging the first battery, the second battery according to the second charging profile resulting in the second battery having a second state of charge, wherein the second zone comprises at least two of the plurality of charging/discharging ports and is configured to charge a plurality of batteries according to the second charging profile.

2. The method of claim 1, wherein the battery exchange machine provides the first battery and the second battery having the second state of charge.

3. The method of claim 1, further comprising providing one or more batteries having the second state of charge in response to receiving the one or more batteries.

4. The method of claim 1 wherein the first and second batteries having the second state of charge are subsequently provided in response to a user providing one or more spent batteries.

5. The method of claim 1 further comprising measuring current of the one or more received batteries under a loading condition, and determining a charging profile based on the measured current.

6. The method of claim 1, wherein the first and second zone each comprise a positive terminal bar comprising a plurality of positive terminals and a negative terminal bar comprising a plurality of negative terminals, the positive terminal bar and the negative terminal bar being configured to apply a same charging program to the plurality of positive terminals and negative terminals.

7. The method of claim 1, further comprising charging in the first zone, a third battery of the one or more batteries according to the first charging profile resulting in the third battery having a second state of charge, and charging in the second zone, a fourth battery of the one or more batteries according to the second charging profile resulting in the fourth battery having a second state of charge.

8. The method of claim 1, further wherein the charging of the first battery is initiated after a predetermined number of batteries have been received in the first zone.

9. The method of claim 1, wherein the first charging profile comprises a battery rejuvenation program.

10. A charging hub comprising:
    a charging unit;
    a control unit in electrical communication with the charging unit for directing operation of the hub;
    memory comprising a plurality of charging programs;
    a plurality of zones, each zone comprising a plurality of charging/discharging ports electrically connected to the charging unit and the control unit,
        wherein the charging/discharging ports of each of the plurality of zones are configured to receive a same charging current or charging voltage and to charge a plurality of devices according to one of the plurality of charging programs,
        wherein the charging unit is configured to select and apply a first charging program from the plurality of charging programs to a first device under charge in a first zone based on a measured voltage, impedance, and capacity of the first device and to select and apply concurrently with the first charging program a second charging program from the plurality of programs to a second device under charge in a second zone based on a measured voltage, impedance, and capacity of the second device, and
        wherein the first charging program applies a different charging current and/or charging voltage than the second charging program; and
    a communication unit configured to allow the control unit to communicate with a remote unit the status of the first and second devices under charge which are received into the charging unit.

11. The charging hub of claim 10, wherein the charging/discharging ports comprise a positive terminal bar comprising a positive terminal, and a negative terminal bar comprising a negative terminal.

12. The charging hub of claim 10, wherein the first charging program comprises a rejuvenation program.

13. The charging hub of claim 10, wherein the hub further comprises an input unit configured to receive input and transmit the received input to the control unit.

14. The charging hub of claim 10, wherein in the input comprises a charging program.

15. The charging hub of claim 10, wherein the charging unit is configured to apply a current pulse to the first device under charge and to measure a voltage spike resulting from the application of the current pulse.

16. The charging hub of claim 10, wherein the control unit is configured to identify the device under charge as rechargeable when the measured voltage spike is less than a predetermined threshold.

17. The charging hub of claim 16, wherein the control unit is configured to identify the device under charge as non-rechargeable when the measured voltage spike is greater than a predetermined threshold.

18. The charging hub of claim 17, wherein the predetermined threshold is approximately 1.5 volts.

19. The charging hub of claim 17, wherein the predetermined threshold is approximately 2 volts.

* * * * *